(12) United States Patent
Digard Brou De Cuissart et al.

(10) Patent No.: US 9,322,286 B2
(45) Date of Patent: Apr. 26, 2016

(54) TURBINE NOZZLE FOR A TURBOMACHINE

(75) Inventors: Sebastien Digard Brou De Cuissart, Paris (FR); David Mathieu, Chelles (FR); Eric Herzer, Houilles (FR); Bruno Richard, Chanteloup les Vignes (FR)

(73) Assignee: SNECMA, Paris (FR)

( * ) Notice: Subject to any disclaimer, the term of this patent is extended or adjusted under 35 U.S.C. 154(b) by 1157 days.

(21) Appl. No.: 12/989,019

(22) PCT Filed: Apr. 17, 2009

(86) PCT No.: PCT/FR2009/000457
§ 371 (c)(1),
(2), (4) Date: Oct. 21, 2010

(87) PCT Pub. No.: WO2009/136016
PCT Pub. Date: Nov. 12, 2009

(65) Prior Publication Data
US 2011/0044798 A1    Feb. 24, 2011

(30) Foreign Application Priority Data
Apr. 24, 2008  (FR) ..................... 08 02293

(51) Int. Cl.
*F01D 9/02* (2006.01)
*F01D 11/00* (2006.01)
*F01D 9/04* (2006.01)
(Continued)

(52) U.S. Cl.
CPC .............. *F01D 11/001* (2013.01); *F01D 9/041* (2013.01); *F01D 11/02* (2013.01); *F01D 25/246* (2013.01); *F05D 2240/55* (2013.01); *F05D 2260/33* (2013.01); *Y02T 50/671* (2013.01)

(58) Field of Classification Search
CPC ........... F01D 1/04; F01D 9/04; F01D 11/001; F01D 11/02; F01D 11/003
USPC ............. 415/168.2, 168.4, 173.7, 174.4, 230, 415/231
See application file for complete search history.

(56) References Cited

U.S. PATENT DOCUMENTS

| 2,812,159 | A | * | 11/1957 | Krebs ........................... 415/119 |
| 3,079,128 | A | * | 2/1963 | Burge ........................... 415/191 |
| 4,094,673 | A | * | 6/1978 | Erickson et al. ................ 75/246 |

(Continued)

FOREIGN PATENT DOCUMENTS

| EP | 0 017 534 | 10/1980 |
| EP | 1 008 725 | 6/2000 |

(Continued)

OTHER PUBLICATIONS

U.S. Appl. No. 12/922,460, filed Nov. 15, 2010, Bariaud, et al.

(Continued)

*Primary Examiner* — Sean J Younger
(74) *Attorney, Agent, or Firm* — Oblon, McClelland, Maier & Neustadt, L.L.P.

(57) ABSTRACT

A turbine nozzle for a turbomachine, the nozzle including two coaxial platforms interconnected by radial vanes, an inner platform being connected to an annular partition that is festooned or crenellated and on which there is fastened an annular support carrying elements made of abradable material. The support is capable of sliding circumferentially over the partition between a mounting-and-dismounting position and a position for locking the support on the partition.

19 Claims, 4 Drawing Sheets

(51) Int. Cl.
*F01D 11/02* (2006.01)
*F01D 25/24* (2006.01)

(56) References Cited

U.S. PATENT DOCUMENTS

| | | | |
|---|---|---|---|
| 4,139,376 A | * | 2/1979 | Erickson et al. ............... 75/229 |
| 4,239,451 A | | 12/1980 | Bouru |
| 4,295,785 A | | 10/1981 | Lardellier |
| 4,623,298 A | * | 11/1986 | Hallinger et al. ............. 415/139 |
| 4,645,424 A | * | 2/1987 | Peters ........................ 416/198 A |
| 4,710,097 A | * | 12/1987 | Tinti ............................. 415/138 |
| 4,767,267 A | * | 8/1988 | Salt et al. ................... 415/173.7 |
| 4,820,119 A | * | 4/1989 | Joyce ........................ 415/173.7 |
| 6,042,334 A | * | 3/2000 | Schilling ................... 415/173.7 |
| 6,139,264 A | | 10/2000 | Schilling |
| 6,220,815 B1 | * | 4/2001 | Rainous et al. ............ 415/174.5 |
| 2007/0231123 A1 | | 10/2007 | Dervaux et al. |

FOREIGN PATENT DOCUMENTS

| | | |
|---|---|---|
| EP | 1 847 687 | 10/2007 |
| GB | 2 022 720 | 12/1979 |

OTHER PUBLICATIONS

International Search Report issued Sep. 28, 2009 in PCT/FR09/000457filed Apr. 17, 2009.

* cited by examiner

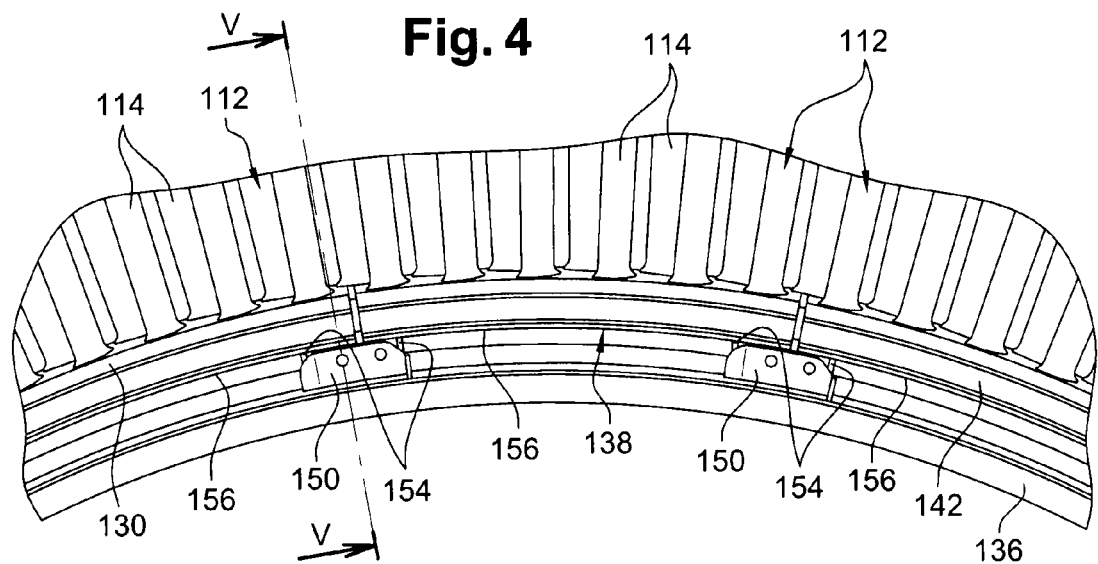
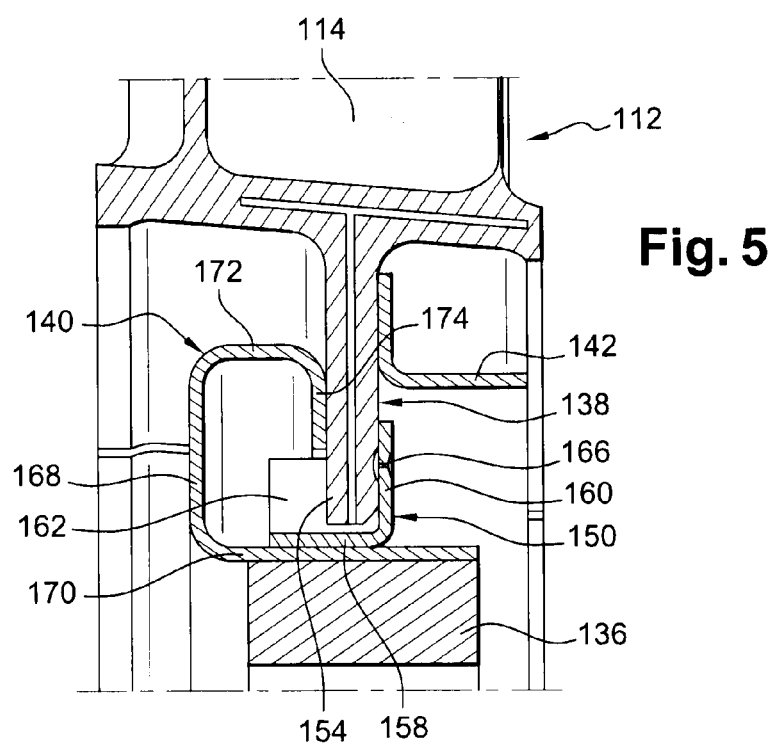

TURBINE NOZZLE FOR A TURBOMACHINE

The present invention relates to a turbine nozzle for a turbomachine such as an airplane turboprop or turbojet.

The turbomachine includes turbine stages each comprising a bladed rotor wheel and a nozzle, each nozzle being sectorized, i.e. made up of a plurality of nozzle sectors that are disposed circumferentially end to end.

Each nozzle comprises two coaxial annular platforms, one lying within the other, and they are interconnected by means of substantially radial vanes. The outer platform includes fastener means for fastening to an outer casing of the turbine, and the inner platform is connected to a substantially radial annular partition that carries elements of abradable material that are situated radially inside the inner platform of the nozzle. The elements of abradable material co-operate with annular wipers carried by the rotor of the turbine so as to form seals of the labyrinth type.

When the elements of abradable material are worn, it is necessary to replace them with new elements during a maintenance operation. In the prior art, those elements are fastened to the annular partition of the inner platform of the nozzle by brazing. Replacing abradable material elements requires the sectors of the nozzle to be completely disassembled, each nozzle sector to be machined in order to remove the worn abradable elements, and new abradable elements to be brazed to the annular partition. It is then necessary to deposit an anti-oxidation coating on each nozzle sector. That operation of replacing abradable elements of a nozzle is therefore lengthy and expensive.

Furthermore, the sectors of a nozzle are spaced apart from one another with small amounts of clearance in the circumferential direction in order to accommodate thermal expansions of their platforms in operation. They are also subjected in operation to relatively high levels of dynamic stress and vibration that can lead to deformations and parasitic movements of the sectors.

Proposals have already been made to stiffen a nozzle with the help of axial thrust means formed on the sectors of the inner platform of the nozzle, the thrust means of a platform sector being designed to co-operate with corresponding means formed on the adjacent inner platform sectors in order to limit deformation of the nozzle in operation.

In the prior art, these thrust means include a very hard material known as "stellite" which is put into place by a laser welding method ("stelliting") that is lengthy, expensive, difficult to implement, and runs the risk of damaging the distributor sectors. That technology is also not suitable for certain nozzles that have platforms of shapes that are too complex (referred to as 3D platforms).

A particular object of the present invention is to provide a solution to the problems of the prior art that is simple, effective, and inexpensive, by simplifying the replacement of the abradable material elements of the nozzle, and by eliminating the need for stelliting the sectors of the nozzle.

To this end, the invention provides a turbine nozzle for a turbomachine, the nozzle being sectorized and made up of sectors placed end to end, and each sector comprising two annular platforms that are coaxial, respectively an inner platform and an outer platform, which platforms are connected together by substantially radial vanes, the inner platform being connected to a substantially radial annular partition, the nozzle being characterized in that the inner periphery of the annular partition of each sector is festooned or crenellated and comprises solid portions alternating with hollow portions, and in that elements of abradable material are fastened to a continuous annular support that includes fastener means for fastening to the annular partitions of the sectors, the support being capable of sliding circumferentially over the partitions and being movable angularly between a mounting-and-dismounting position and a locking position in which the fastener means co-operate with the solid portions of the annular partitions of the sectors in order to hold the support on the partition.

Unlike the prior art, the abradable element support of the invention is removably mounted on the partition, thereby facilitating replacement of worn abradable elements. It suffices to turn the annular support over the partitions of the sectors and to replace the support with a new support carrying new abradable elements. Re-mounting the support on the partitions of the sectors is furthermore simple and quick, since it may be performed on a set of nozzles that are already in place in the turbomachine.

The invention also serves to simplify fabrication of each nozzle sector, which is obtained as a casting, since the support for the abradable elements is now provided independently of the sectors.

The weight of the partition of the nozzle is also reduced because of its festooned or crenellated shape.

The annular support is not sectorized and it extends circumferentially over all of the sectors of the nozzle, thereby enabling the sectors of the nozzle to be stiffened and limiting their vibration and their parasitic movements in operation while allowing them to expand circumferentially. There is therefore no longer any need to deposit hard material by stelliting on the axial thrust means of the nozzle sectors, thereby making it possible to omit that lengthy and expensive operation and to avoid any risk of damaging the nozzle sectors while performing that difficult operation.

According to another characteristic of the invention, the support is in the form of a rail and is made of sheet metal, which may serve in particular to make the nozzle significantly lighter than in the prior art.

The fastener means may define portions of an annular groove that is open radially outwards and in which the solid portions of the partitions of the nozzle sectors are received in the locking position. Each of these annular groove portions advantageously has one circumferential end that is open for engaging the fastener means on at least one solid portion of a partition of a nozzle sector, and an opposite circumferential end that is closed for preventing the support from turning in one direction on the partition. The fastener means may present a section that is substantially L- or U-shaped, and may be regularly distributed around a circumference of the support. In the mounting position, each partition is preferably held clamped by the fastener means so as to limit vibration of the support in operation.

The fastener means are preferably made of sheet metal and are fitted on the annular support and fastened thereto, e.g. by brazing or welding. By way of example, the fastener means are formed by pieces of folded sheet metal.

The number of solid portions in the partition may be equal to the number of sectors in the nozzle, for example. The solid portions may be formed at the circumferential ends of the partitions of the nozzle sectors. The partition of each sector may include at each of its circumferential ends one fraction of a solid portion with the other fraction thereof being formed at a circumferential end of the partition of an adjacent nozzle sector. The solid portions may present an angular extent or dimension in the circumferential direction that is less than or equal to the corresponding dimension of the hollow portions. The fastener means may also present an angular extent or dimension in a circumferential direction that is equal to or greater than the corresponding dimension of the solid portions of the partitions of the sectors.

Annular deflectors made of sheet metal may also be fastened to the partitions of the nozzle sectors, e.g. by brazing. These annular deflectors are designed to co-operate with corresponding elements of rotor wheels situated upstream and downstream from the nozzle in order to limit the passage of air in a radial direction between the nozzle and said rotor wheels.

The invention also provides nozzle sectors for a nozzle of the above-specified type, comprising two coaxial annular platforms, respectively an inner platform and an outer platform that are connected together by substantially radial vanes, the inner platform being secured to a radially inner annular partition, the sector being characterized in that the inner periphery of the partition is festooned or crenellated and comprises solid portions alternating with hollow portions.

The invention also provides a continuous annular support for a nozzle as described above, characterized in that it includes fastener means regularly spaced apart around the axis of the support and defining annular grooved portions.

The invention also provides a low pressure turbine for a turbomachine including at least one nozzle of the above-specified type, and also a turbomachine, such as an airplane turboprop or turbojet including at least one nozzle as described above.

The invention can be better understood and other details, characteristics, and advantages of the present invention appear more clearly on reading the following description given by way of non-limiting example and with reference to the accompanying drawings, in which:

FIG. 4 is a fragmentary diagrammatic perspective view of a nozzle of the invention;

FIG. 5 is a section view on line V-V of FIG. 4, and on a larger scale;

Figure 1:
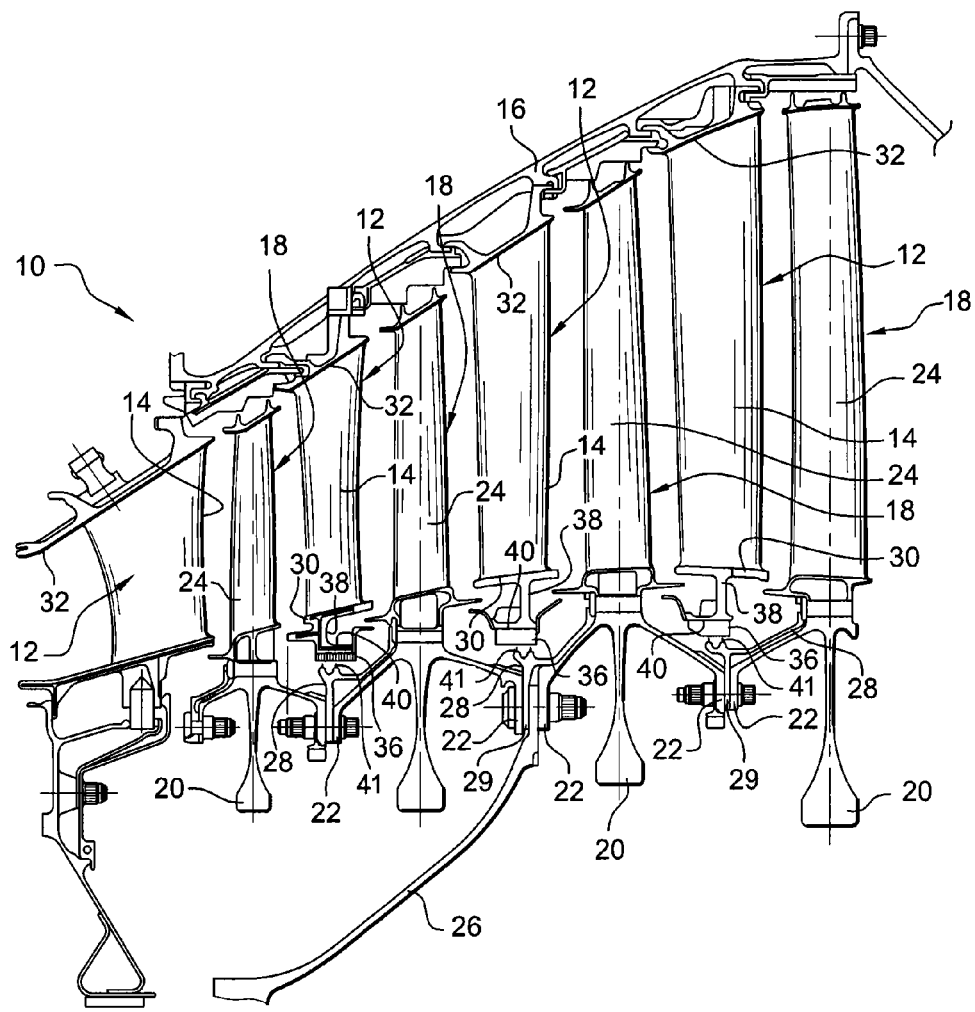
FIG. 1 is a diagrammatic half-view in axial section of a low pressure turbine in a turbomachine.

Reference is made initially to FIG. 1, which shows a low pressure turbine 10 of a turbomachine, the turbine comprising four stages, each comprising a nozzle 12 carried by an outer casing 16 of the turbine and a bladed wheel 18 situated downstream from the nozzle 12.

The wheels 18 comprise disks 20 that are assembled together about a common axis by annular flanges 22 and that carry blades 24 that extend substantially radially. These wheels 18 are connected to a turbine shaft (not shown) via a drive cone 26 that is fastened to the annular flanges 22 of the disks.

Annular cheekplates 28 for retaining the blades 24 axially on the disk 20 are mounted between the disks, and each of them includes an inner radial wall 29 clamped axially between the annular flanges 22 of two adjacent disks.

Each nozzle 12 comprises two coaxial annular platforms 30 and 32, respectively an inner platform and an outer platform, defining between them an annular flow section for gas passing through the turbine, and substantially radial stationary vanes 14 extend between them. The outer platforms 32 of the nozzles are fastened by appropriate means to the outer casing 16 of the turbine.

The inner platform 30 of each nozzle is secured to a radially inner annular partition 38 carrying annular elements 36 of abradable material, these elements 36 being arranged on a cylindrical surface of the annular partition 38. In the example shown, the annular partition 38 is substantially radially and its outer periphery is connected to the inside surface of the inner platform 30 of the nozzle. The abradable elements 36 are fastened to the inner cylindrical periphery of the annular partition 38.

The abradable elements 36 are arranged radially on the outside, facing outer annular wipers 41 carried by the cheekplates 28. The wipers 41 are designed to co-operate with the elements 36 by rubbing against them so as to form labyrinth seals and limit the flow of gas in an axial direction through these seals.

The nozzles 12 of the turbine are sectorized, each being made up of a plurality of sectors placed circumferentially end-to-end around the longitudinal axis of the turbine.

Figure 2:
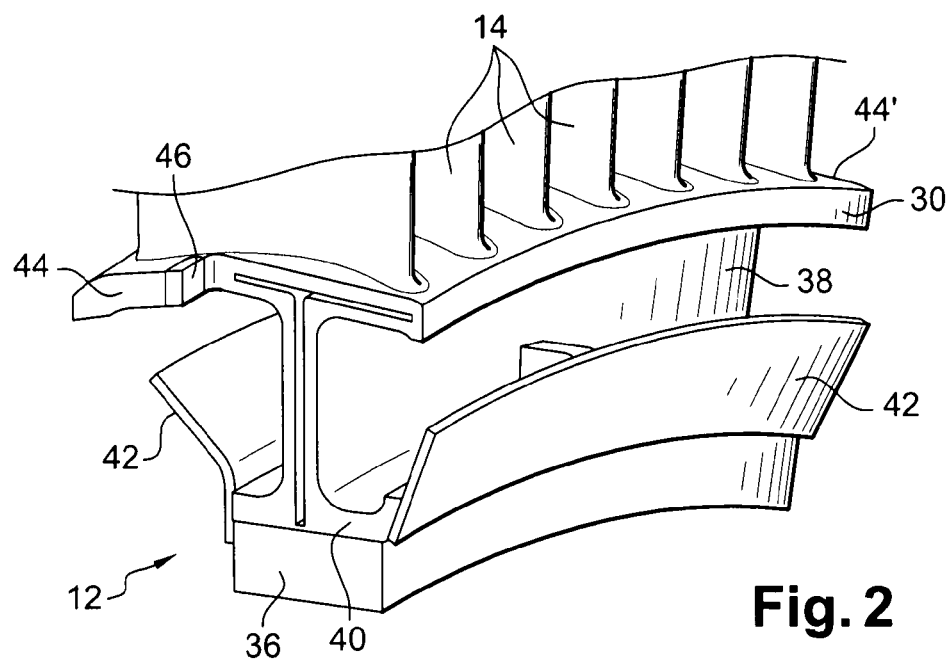
FIG. 2 is a fragmentary view in perspective of a nozzle sector made in accordance with the art prior to the invention.

FIG. 2 shows a portion of a nozzle sector 12 made in accordance with the art prior to the present invention. The nozzle sector 12 comprises a sector of the inner platform 30 and a sector of the outer platform (not shown) interconnected by seven vanes 14. The sector of the inner platform 30 is secured to a partition sector 38 carrying abradable elements 36. The sector of the platform 30 and the sector of the partition 38 are made as a one-piece casting.

In the prior art, the abradable elements 36 are fastened to the inner periphery of the sector of the partition 38 by brazing. Annular deflectors 42 made of sheet metal are also fastened by brazing to the inner periphery of the sector of the partition 38, both upstream and downstream of the abradable elements 36. These deflectors 42 co-operate by a baffle effect with corresponding means of the bladed wheels 18 situated upstream and downstream from the nozzle so as to limit the flow of gas in a radial direction between the nozzle and those bladed wheels.

Under such circumstances, replacing the abradable elements 36 is an operation that is lengthy and expensive, as mentioned above.

Figure 3:
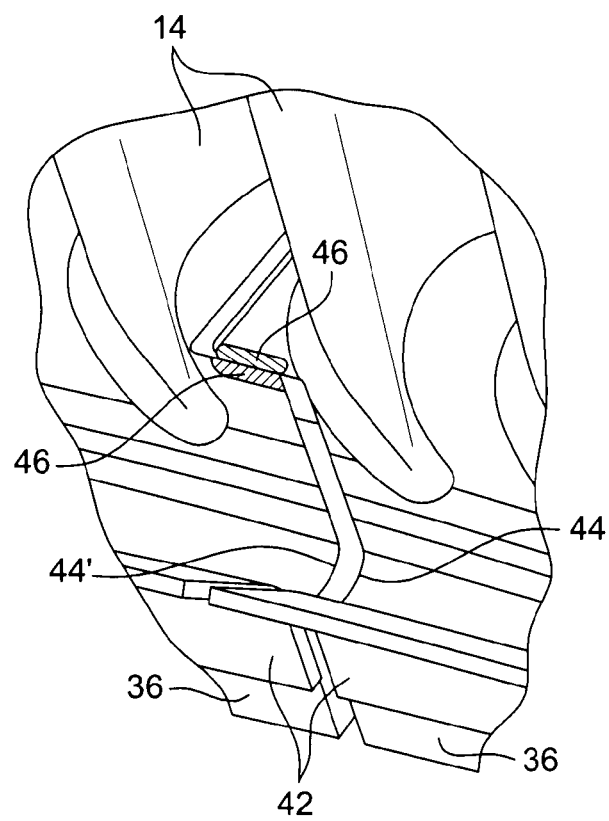
FIG. 3 is a diagrammatic perspective view of axial thrust means between two adjacent nozzle sectors of the prior art.

The longitudinal edges 44, 44' of the sector of the inner platform 30 of each sector of the nozzle 12 have, at their circumferential ends, shapes that are complementary to the corresponding longitudinal edges of the sectors of the inner platforms of the sectors of the adjacent nozzles, so that the ends of the longitudinal edges engage circumferentially one within another when the nozzle is assembled (FIG. 3).

In the prior art, the ends of the longitudinal edges 44, 44' of the sectors of the inner platform 30 are machined to have a Z-shape so as to define axial thrust means 46 between the sectors of the nozzle 12. The axial thrust of a sector of the inner platform 30 against the sector of the adjacent inner platform serves to limit parasitic movements and vibration between the sectors of the nozzle 12 when the turbine is in operation.

The thrust means 46 include a hard material known as "stellite" that is deposited by a method that is lengthy, expensive, and difficult to implement, as likewise mentioned above.

The invention serves to remedy the above-mentioned problems at least in part by means of a non-sectorized annular support 140 that is fastened releasably on the annular partition 138 of the nozzle and that carries the elements 136 of abradable material.

In the embodiment shown in FIGS. 4 to 8, the annular support 140 is in the form of a rail and it is made out of sheet metal, e.g. out of pressed sheet metal.

The support 140 extends over at least 360° and enables the set of sectors of the nozzle 112 to be stiffened, and the circumferential ends thereof need not have any stellite. The ends of the longitudinal edges 144, 144' of the sectors of the inner platform of each nozzle may be Z-shaped, as in the prior art, in order to conserve the axial thrust surfaces, or they may be straight in section so as to eliminate the axial thrust surfaces.

In the present invention, the annular support 140 has fastener means 150 defining at least part of an annular groove that is open in a radially outward direction and in which the inner periphery of a radial partition 138 of a nozzle sector is received, which periphery is festooned or crenellated. The support 140 is mounted on and removed from the inner periphery of the partition 138 in simple and quick manner, as described in greater detail below, thereby facilitating replacement of abradable elements 136 once they are worn.

The inner periphery of the partition 138 of each sector of the nozzle 112 has solid portions 154 alternating with hollow portions 156, the solid portions 154 being regularly distributed around the axis of the nozzle.

In the example shown, the solid portions 154 are situated at the circumferential end portions of the sectors of the nozzle 112. Each solid portion 154 comprises a half-portion formed on one end of a sector of the partition 138 of a sector of the nozzle, and a complementary half-portion formed at the end of a sector of the partition of a sector of the adjacent nozzle. The partition 138 of each sector thus includes a single hollow portion 156 that extends over a middle portion of said partition.

The solid portions 154 may have an angular extent or dimension in the circumferential direction that represents about 10% to 30% of the angular extent of a sector of the nozzle 112.

Figure 6:
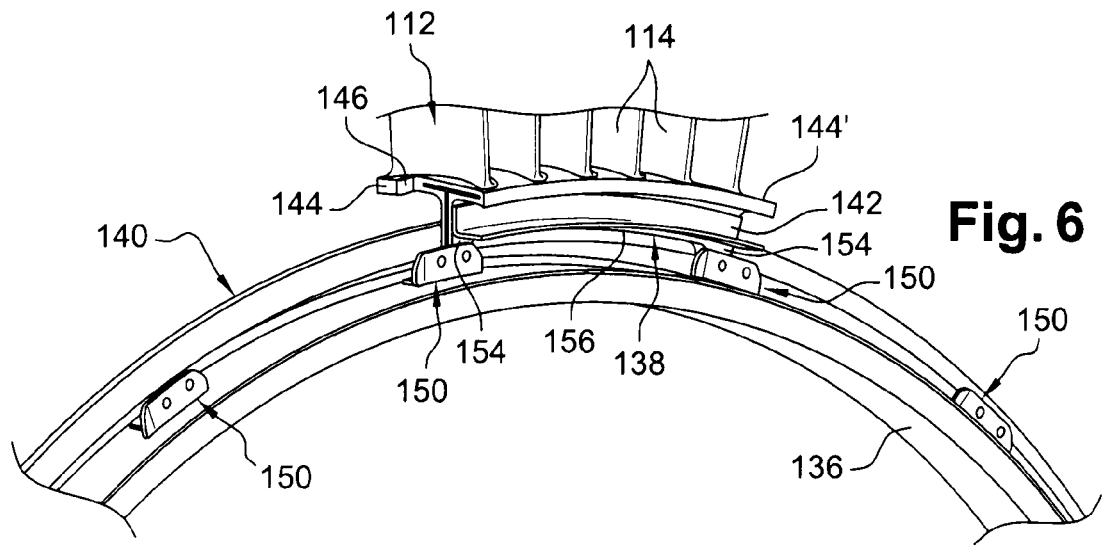
FIG. 6 is a fragmentary diagrammatic perspective view of a nozzle sector and of a support for abradable elements in accordance with the invention.

The partition of each nozzle sector also carries annular deflectors 142 of the above-mentioned type that are fastened by brazing or welding to at least one of the side faces of the partition 138. These deflectors 142 are situated radially outside the hollow portions 156 so as to avoid impeding assembly of the support 140 on the partition 138 (FIG. 6).

In the example shown in FIG. 5, the support 140 is substantially C-shaped in section and has a radial annular wall 168 connected at its inner and outer peripheries to respective inner and outer cylindrical walls 170 and 172. The axial end portion of the outer cylindrical wall 172, situated on the side opposite to the radial wall, is folded inwards so as to form a radial annular rim 174 extending inwards from the outer wall 172.

The elements 136 of abradable material are fastened to the inner cylindrical surface of the wall 170 of the support 140, and the fastener means 150 are fastened of the outer cylindrical surface of the wall 170 of the support.

Figure 7:
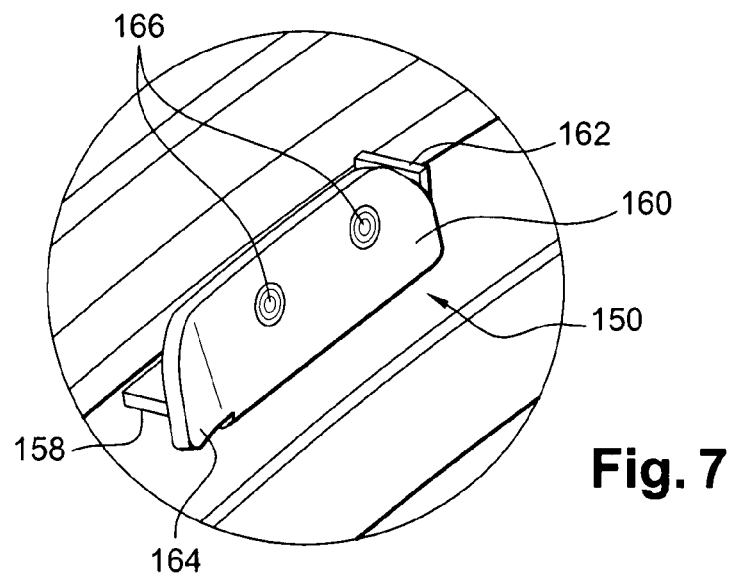
FIG. 7 is a view on a larger scale of a portion of FIG. 6 and shows the fastener means for fastening the support for abradable elements in accordance with the invention.
Figure 8:
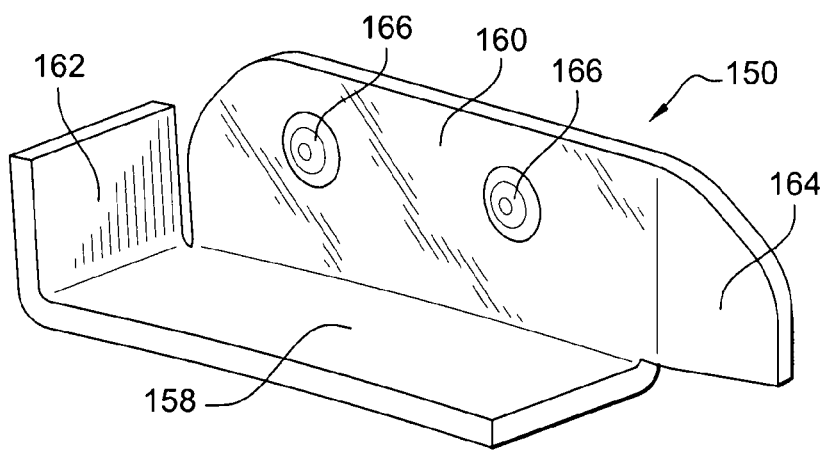
FIG. 8 is a diagrammatic perspective view of the fastener means of FIG. 6.

In the example shown, the fastener means are substantially L-shaped in section and they are made of folded sheet metal. Each of them has two flanges 158 and 160 (FIGS. 7 and 8).

A first flange 158 is generally cylindrical in shape being centered on the axis of the support 140 and it is pressed against the outside surface of the wall 170 of the support 140 and fastened thereto, e.g. by welding. The second flange 160 extends radially outwards from its end connected to the first flange 158, substantially parallel to the annular rim 174 of the support (FIG. 5).

The fastener means 150 define portions of an annular groove in which the solid portions 154 of the partitions 138 are received. Each portion is open at one circumferential end and closed at its opposite circumferential end. Each closed end is obtained in the example shown by folding by a circumferential end portion of the first flange 158 so as to form a radial rim 162 constituting an abutment in the circumferential direction. This abutment is designed to retain the support 140 in a circumferential direction on the nozzle by the rim 162 bearing circumferentially against an adjacent solid portion 154 of the partition 138.

The second flange 160 has its circumferential end opposite from the rim 162 likewise folded away from the support 140 to form a rim 164 for guiding the support while it is being mounted on the partitions 138.

This second flange 160 also includes bosses 166 that project from the face of the flange that is situated substantially facing the annular rim 174 of the support 140. These bosses 166 are formed by plastically deforming the second flange 160, in the example shown. They serve to keep the solid portions 154 of the partitions that are interposed between the rim 174 of the annular support 140 clamped axially against the second flanges 160 of the fastener means (FIG. 5), so as to limit vibration of the support 140 while in operation.

The radially outer faces of the first flanges 158 of the fastener means 150 may come to bear radially against the radially inner ends of the solid portions 154 of the partitions in order to center the support 140 relative to the nozzle.

The fastener means 150 have an angular extent or dimension in the circumferential direction that is, by way of example, equal to or and preferably greater than the corresponding dimension of the solid portions 154 of the partitions of the sectors of the nozzle, and less than the corresponding dimension of the hollow portions 156 of said partitions. The radially outer ends of the second flanges 160 of the fastener means 150 define a diameter that is slightly smaller than the diameter defined by the bottoms of the hollow portions 156 of the partitions and than the diameter defined by the radially inner surfaces of the deflectors 142 (FIG. 4). In this way, the fastener means 150 can be engaged in the hollow portions 156 of the partitions 138 of the sectors of the nozzle when the support 140 is in axial alignment with the nozzle 112 and is moved in axial translation against the nozzle. The hollow portions 156 present an annular extent or dimension in the circumferential direction that, for example, is greater than the corresponding dimension of the solid portions 154.

The annular support 140 is fastened to the sectors of the nozzle 112 as follows. The sectors of the nozzle 112 are disposed circumferentially end-to-end. The support 140 is aligned with the sectorized nozzle 112 on its axis and with the fastener means 150 of the support in axial alignment with the hollow portions 156 of the partition 138 of the nozzle 112. The support 140 is subsequently moved in axial translation towards the nozzle until the annular rim 174 of the support bears axially against the annular partitions 138 of the nozzle. In this position, referred to as the mounting-and-dismounting position, the fastener means 150 are situated in register with the hollow portions 156 of the partition and they are substantially in alignment in the circumferential direction with the solid portions 154 of the partition. The support 140 is then turned in a circumferential direction relative to the nozzle until the solid portions 154 of the inner periphery of the partitions 138 penetrate into the fastener means 150. The solid portions 154 slide in a circumferential direction over the rims 164, which guide them in the fastener means 150. The support 140 slides circumferentially over the partitions until the solid portions 154 of the partitions 138 come into abutment against the rims 162 of the fastener means 150. The above-mentioned operations are performed in the reverse order in order to dismount the nozzle, and in order to replace the support 140 or the abradable elements 136 of the support.

The invention claimed is:

1. A turbine nozzle for a turbomachine, the nozzle being sectorized and comprising:
    sectors placed end to end, and each sector comprising two annular platforms that are coaxial, respectively an inner platform and an outer platform, said two annular platforms are connected together by substantially radial vanes, the inner platform being connected to a substantially radial annular partition, wherein an inner periphery of the annular partition of each sector is festooned or crenellated and comprises radially extending solid portions alternating with hollow portions;
    a non-sectorized annular support to which elements of abradable material are fastened, the annular support extending continuously over 360°; and
    a fastener mechanism for fastening the annular support to the annular partitions of the sectors,
    wherein the support is capable of sliding circumferentially over the partitions and being movable angularly between a mounting-and-dismounting position and a locking position in which the fastener mechanism co-operates with the solid portions of the annular partitions of the sectors to hold the support on the partition, and
    wherein the fastener mechanism includes a radially extending flange which axially abuts a radially extending surface of the annular partition, and a radially extending rim which abuts a circumferential end of the solid portion of the annular partition in the locking position, and
    wherein the support is substantially C-shaped and includes a radially annular wall connected to inner and outer cylindrical walls at inner and outer radial ends of the radially annular wall.

2. A nozzle according to claim 1, wherein the support is in a form of a rail and is made of sheet metal.

3. A nozzle according to claim 1, wherein the fastener mechanism defines annular groove portions that are open radially outwards and in which there are received the solid portions of the annular partitions of the sectors in the locking position.

4. A nozzle according to claim 3, wherein each annular groove portion includes one circumferential end that is open for engaging the fastener mechanism on at least one solid portion of the partition.

5. A nozzle according to claim 1, wherein the fastener mechanism presents a section that is substantially L or U-shaped, and is regularly distributed around a circumference of the support.

6. A nozzle according to claim 1, wherein the fastener mechanism is made of sheet metal and fitted to the annular support and fastened, or brazed, or welded thereto.

7. A nozzle according to claim 6, wherein the fastener mechanism includes a folded sheet metal.

8. A nozzle according to claim 1, wherein the solid portions are formed at the circumferential ends of the partitions of the sectors of the nozzle.

9. A nozzle according to claim 8, wherein the partition of each sector includes at each of its circumferential ends one fraction of a solid portion having its other fraction formed by a circumferential end of the partition of an adjacent sector of the nozzle.

10. A nozzle according to claim 1, wherein the fastener mechanism presents an annular extent or dimension in a circumferential direction that is equal to or greater than a corresponding dimension of the solid portions of the partitions of the sectors.

11. A nozzle according to claim 1, further comprising annular deflectors of sheet metal fastened or brazed to the partition.

12. A nozzle sector for a nozzle according claim 1, the sector comprising:
    two coaxial annular platforms, respectively an inner platform and an outer platform, that are connected together by substantially radial vanes, the inner platform being secured to a radially inner annular partition,
    wherein the inner periphery of the partition is festooned or crenellated and comprises solid potions alternating with hollow portions.

13. A continuous annular support for a nozzle according to claim 1, including a fastener mechanism regularly spaced apart around the axis of the support and defining annular grooved portions.

14. A continuous annular support according to claim 13, made of sheet metal.

15. A nozzle according to claim 1, wherein an axial end portion of the outer cylindrical wall of the support is folded inward so as to present a radial annular rim extending inward from the outer cylindrical wall.

16. A nozzle according to claim 1, wherein the fastening mechanism includes a cylindrical flange, the radially extending flange of the fastening mechanism radially extends from an axial end of the cylindrical flange, and the radially extending rim of the fastening mechanism extends from a circumferential end of the cylindrical flange.

17. A nozzle according to claim 16, wherein a radially outer face of the cylindrical flange of the fastening mechanism abuts the solid portion of the annular partition, and a radially inner face of the cylindrical flange of the fastening mechanism abuts the support.

18. A low pressure turbine for a turbomachine, the turbine comprising at least one nozzle according to claim 1.

19. A turbomachine, an airplane turboprop, or a turbojet, comprising at least one nozzle according to claim 1.

* * * * *